(12) United States Patent
Hyvönen et al.

(10) Patent No.: US 7,334,611 B2
(45) Date of Patent: Feb. 26, 2008

(54) ARRANGEMENT IN CONNECTION WITH CROSSCUTTING SAW OF HARVESTER

(75) Inventors: Jorma Hyvönen, Iisalmi (FI); Markku Huttunen, Iisalmi (FI); Eero Hotti, Sonkajärvi (FI)

(73) Assignee: Ponsse Oyj, Vierema (FI)

( * ) Notice: Subject to any disclaimer, the term of this patent is extended or adjusted under 35 U.S.C. 154(b) by 0 days.

(21) Appl. No.: 10/583,917

(22) PCT Filed: Dec. 21, 2004

(86) PCT No.: PCT/FI2004/000787
§ 371 (c)(1),
(2), (4) Date: Jun. 21, 2006

(87) PCT Pub. No.: WO2005/060735
PCT Pub. Date: Jul. 7, 2005

(65) Prior Publication Data
US 2007/0068600 A1 Mar. 29, 2007

(30) Foreign Application Priority Data
Dec. 22, 2003 (FI) .................................. 20031893

(51) Int. Cl.
*A01G 23/091* (2006.01)
(52) U.S. Cl. ........................................ 144/4.1; 144/34.1
(58) Field of Classification Search ............... 144/4.1, 144/34.1, 335–336
See application file for complete search history.

(56) References Cited

U.S. PATENT DOCUMENTS

| 4,569,135 | A | | 2/1986 | Morabit |
| 5,056,224 | A | * | 10/1991 | Seigneur .................... 30/123.4 |
| 5,267,594 | A | * | 12/1993 | Wiemeri et al. ............ 144/336 |
| 5,816,299 | A | | 10/1998 | Mathews et al. |

FOREIGN PATENT DOCUMENTS

| FI | 4158 | 9/1999 |
| FI | 5638 | 12/2002 |
| FI | 20021379 | 1/2004 |
| SE | 469773 | 7/1991 |
| SE | 469773 | 9/1993 |
| SE | 517665 | 7/2002 |
| WO | WO 2004/006654 | 1/2004 |

* cited by examiner

*Primary Examiner*—Shelley M. Self
(74) *Attorney, Agent, or Firm*—Young & Thompson

(57) ABSTRACT

An arrangement in connection with a crosscutting saw of a harvester. Herein, a lattice-like structure composed of strips is provided in a saw casing of the crosscutting saw, the structure being substantially on the same section plane as the rotational movement of a chain of the crosscutting saw. The strips are arranged in the saw casing in such a manner that substantially each movement path tangent generated at a lower edge in a guide bar of the chain or at an outer track on the side of the saw casing in the chain wheel is arranged to encounter a surface in the strip. This provides a structure that enhances a controlled removal of sawdust or other pieces flowing to the saw casing during sawing.

13 Claims, 1 Drawing Sheet

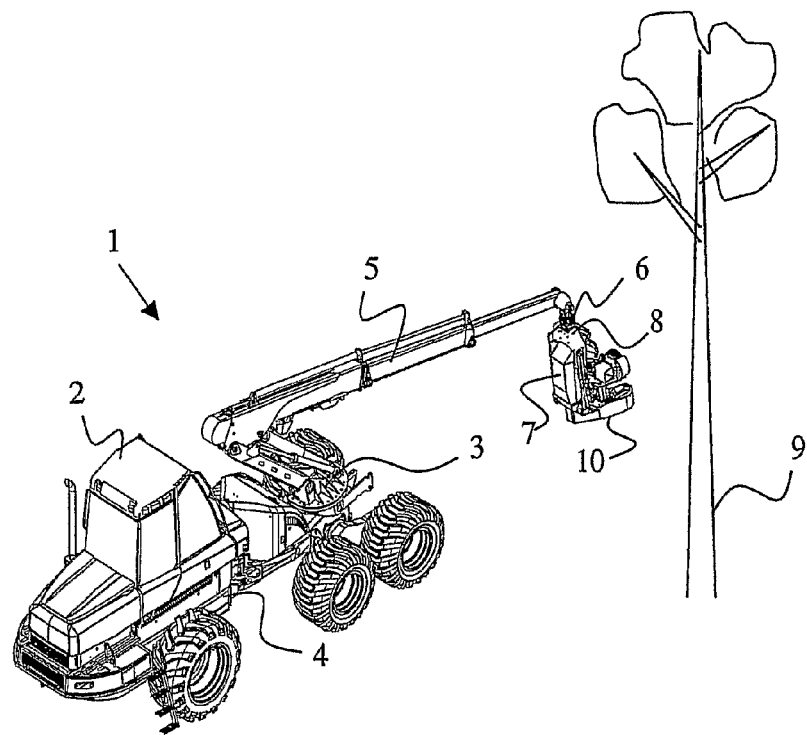
FIG. 1
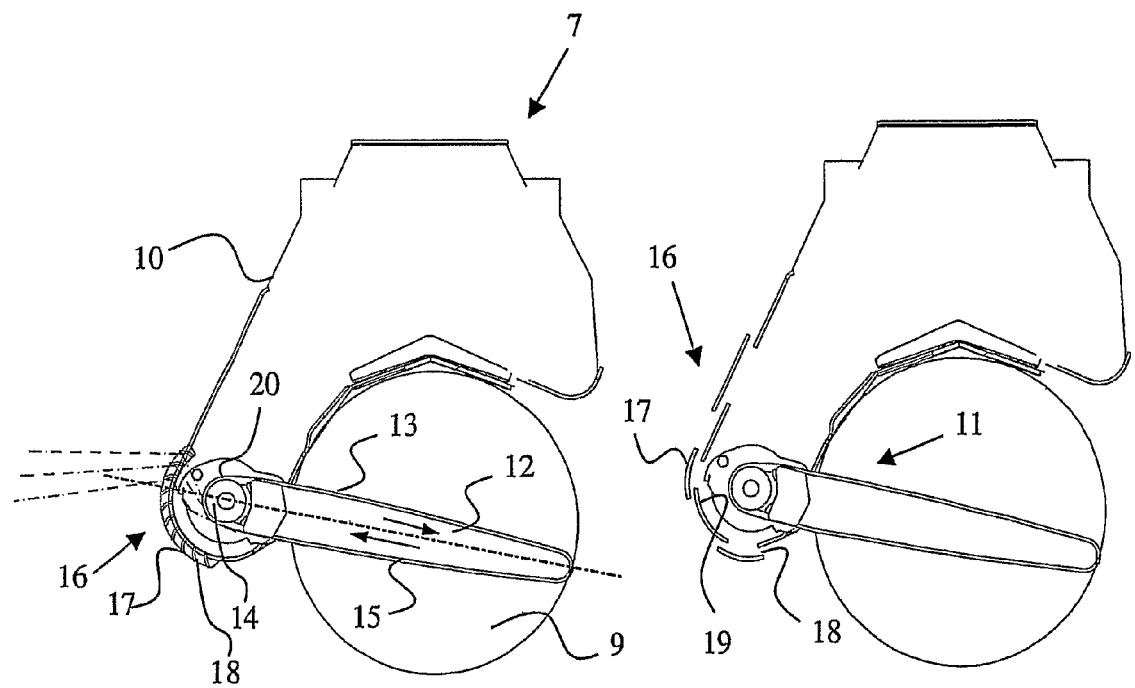
FIG. 2
FIG. 3

ARRANGEMENT IN CONNECTION WITH CROSSCUTTING SAW OF HARVESTER

BACKGROUND OF THE INVENTION

The present invention relates to an arrangement in connection with a crosscutting saw of a harvester. Such an arrangement is intended for use particularly in connection with a crosscutting saw at a harvester head of a harvester moving in the terrain.

Since the tendency in modern harvesters is towards an optimally short time taken up by crosscut-sawing, there is a continuous trend in the field to increase the speed of rotation of chainsaws and, at the same time, the peripheral speed of the therein provided chain up to the maximum values set by the chain manufacturer. The ever-increasing speed of the chain increases the risk of the chain breaking during sawing or pieces being detached from it. If the chain breaks, it may cause a so-called chain blast, wherein the chain or parts thereof are thrown into the surroundings of the chainsaw with a high force and speed causing a significant safety risk in the working environment. There exist distinct findings that the number of such accidents has increased significantly.

However, the saw casing of a chainsaw cannot be made entirely enclosed, even if that prevented such problems or at least significantly lessened the risks caused by a dangerous chain blast. When a tree trunk is felled or crosscut-sawn, much sawdust is produced, which is packed inside the saw casing during sawing. The problem is particularly emphasized in winter conditions when not only sawdust, but also snow is packed inside the saw casing. Accordingly, sawdust and snow would rapidly fill an encased saw casing, finally using up all the space required for the movement of the chainsaw. This is why prior art saw casings comprise a relatively open structure at that end of the chainsaw where the guide bar is hinged to the harvester head.

Attempts have been made previously to solve this problem, whereby device parts are known that are arranged in connection with the crosscutting saw at the harvester head of the harvester and used to attempt to prevent the chain of the crosscutting saw or parts thereof from being thrown in directions hazardous to the driver or objects or people in the environment. For example, patent publication WO 02/071833 discloses a solution wherein one or more movably arranged guarding members are arranged in connection with the saw casing substantially on the same plane as the rotational movement of the chain of the crosscutting saw. In the solution according to said patent publication, these guarding members are, however, arranged movable. Accordingly, the guarding members are kept in different positions when felling a tree and when cutting the tree into logs. The purpose of this solution is to achieve a protective effect as covering as possible, but at the same time, attempt to prevent any damage to the guarding members during delimbing, for example. The solution presented does lead to a complex structure and will probably restrict the usage of the harvester head. The use of the guarding member according to the solution does not, in spite of it all, bring about a complete security about the chain, when breaking or becoming detached from the sawing device. The previous guard member does not prevent a so-called chain blast in hazardous directions, since the tip of the guide bar of the crosscutting saw still propagates unprotected during most of the sawing.

BRIEF DESCRIPTION OF THE INVENTION

The object of the present invention is to eliminate prior art drawbacks and to provide a completely new solution for the structure and function of an arrangement in connection with the crosscutting saw of a harvester.

The invention is based on the idea of arranging the chain wheel of the crosscutting saw to be partly surrounded by protective structures arranged in the saw casing. These protective structures are arranged to overlap and preferably to guide the sawdust and any loose pieces flying from the chainsaw downwards during crosscut-sawing. Thus, no straight-lined connection exists to the outside of the saw casing from any movement path tangent of the lower edge of the guide bar or the outer track on the side of the saw casing of the chain wheel.

Preferred embodiments of the invention are described below.

As employed in the description, terms, such as 'up', 'down', 'over', 'under' and so on, illustrate the features of the invention in directions relative to the arrangement according to the invention in connection with the crosscutting saw of a harvester as presented in the attached figures.

The invention brings about significant advantages. Accordingly, according to studies conducted, in most cases when a chain blast takes place, the chain or a part detached from it is directed substantially in the direction of the longitudinal axis of the guide bar backwards in the direction of the chain wheel. It is easy to stop such a tangential movement with the overlapping protective structures of the invention. When hitting a protective structure, the chain or the part detached from it loses a significant part of its kinetic energy and is directed away from the control cabin or stops entirely at the protective structure and remains inside the saw casing.

On the other hand, the frame structure of the saw casing designed in the present manner or the arrangement provided in the frame brings forth the advantage of preventing the sawdust produced by the chainsaw and the oil used for lubricating the chain from spreading widely into the surroundings of the harvester, where it would cause impaired visibility and increased need for cleaning the windows of the control cabin of the harvester.

The arrangement in connection with the crosscutting saw of a harvester according to the invention is simple to connect to harvester heads of harvesters already in use, and it thereby significantly increases work safety.

The present arrangement in connection with the crosscutting saw of a harvester does not affect the use of the harvester head in sawing, as do arrangements projecting from the saw casing, for example. It requires no extra work steps that would inconvenience work and does in no way complicate the servicing of the harvester head.

The arrangement according to the invention does not either damage a chain detached from the guide bar as badly as do protective structures following the movements of the guide bar. Accordingly, the chain, when detached from the guide bar, can often be taken into use again after servicing operations.

BRIEF DESCRIPTION OF THE FIGURES

In the following, the invention will be described in more detail in connection with preferred embodiments with reference to the accompanying drawing, in which FIG. 1 schematically shows an overview of a harvester, known per se, FIG. 2 shows an arrangement at the harvester head of a harvester in connection with a crosscutting saw, with the harvester head shown from behind in a position during crosscut-sawing of a felled tree, and FIG. 3 shows another embodiment of an arrangement in connection with a crosscutting saw, also with the harvester head shown from behind.

DETAILED DESCRIPTION OF PREFERRED EMBODIMENTS

In the following, preferred embodiments of the invention will be described with reference to the above figures. Herein, the arrangement in connection with a crosscutting saw of a harvester comprises the structural parts denoted in the figures by reference numerals, corresponding to the reference numerals used in the present description.

FIG. 1 shows a wheel-mounted harvester 1, known per se. It comprises a control cabin 2 and a crane 5 arranged via a rotating device 3 to an undercarriage 4 and arranged tiltable in the longitudinal direction of the machine. In addition to the fastening between the undercarriage and the crane, the crane is provided with a necessary number of degrees of freedom to enable effective harvesting within the entire movement range of the crane. A harvester head 7 supported by a rotator 6 is arranged in the crane, the harvester head being rotatable about its substantially vertical axis by means of the rotator.

The harvester head is suspended from the rotator via a special link 8 hinged in a turning manner to the frame of the harvester head. This enables tilting of the harvester head and a tree trunk 9 processed therein after felling-sawing into a substantially horizontal position for the duration of the delimbing and crosscut-sawing of the tree. Felling and crosscut-sawing are performed with the crosscutting saw placed in a saw casing 10 at the harvester head, the crosscutting saw usually employed being a chainsaw 11.

FIG. 2 schematically shows the harvester head 7 of the harvester 1. The harvester head supports the tree trunk 9 to be cut and being cut by means of a chain 13 revolving about a guide bar 12 in the chainsaw 11. The chain is driven with a chain wheel 14, which is placed at the fastening end of the guide bar in the saw casing 10 surrounding the chainsaw in a dormant state. The saw casing is rigidly fastened to the frame of the harvester head in a manner known per se.

When the tree trunk 9 is being sawed, the chain 13 revolves, driven by the chain wheel 14, clockwise relative to the guide bar 12 in accordance with FIG. 2. Since the majority of the stresses the chain is subjected to is directed thereto in the actual sawing situation, this takes place in the contact area of the guide bar and the tree trunk, i.e. at a lower edge 15 of the guide bar. Consequently, in malfunction of the chain, i.e. when it breaks down or is displaced from the guide bar, this takes place mainly on the lower edge of the guide bar with the chain on the way towards the chain wheel and the saw casing 10. As a result of the malfunction, the entire chain or part thereof is thrown at a high velocity towards the saw casing and via conventional sawdust openings therein further to the environment.

In order to avoid a dangerous situation caused by malfunction, a special protective structure 16, i.e. an arrangement in connection with the crosscutting saw, is arranged in the saw casing 10, its purpose being to prevent the chain 13 or a part thereof from being thrown further to the outside of the harvester head 7. The present arrangement comprises a lattice-like structure composed of strips 17 in the saw casing, the structure being substantially on the same section plane as the rotational movement of the chain. Such strips are arranged in the saw casing such that their longitudinal axis is substantially parallel to the rotational axis of the chain wheel. However, the strips are arranged to overlap in the saw casing such that at least one gap 18 remains between the strips, allowing sawdust or other impurities flowing into the saw casing during sawing to be removed from the saw casing.

Thus, it may be stated that the strips 17 are partly overlapping and at an angle to the tangent of the chain wheel 14 which extends to the strips at the point where the chain 13 touches the chain wheel for the first time when coming from the guide bar 12. This being so, seen in the direction of said tangent, the opposite edges of adjacent strips are preferably approximately at the same point. However, seen perpendicularly to this direction, the gap 18 enabling the removal of sawdust is formed between the edges of the strips. During sawing, when the guide bar turns, the tangents generated at each particular point of the guide bar form a substantially circular sector, and the strips preferably form a circular arc relative to the midpoint of the chain wheel.

However, for removal of sawdust, these strips 17 do not necessarily have to be of the width of the entire saw casing 10. It is indeed sufficient that the strips are arranged symmetrically relative to the cutting plane formed by the rotational plane of the guide bar 12 and the chain 13 such that they cover the chain line on said plane with sufficient certainty. In this case, the strips are able to stop a broken chain at the same time as they guide the fastest and farthest flying middle part of a stream generated from sawdust away from the cabin 2.

The orientation angle formed by an outer surface 19 in the strips 17 has to be as obtuse as possible in order for a sufficiently efficient sawdust removal to be achieved. On the other hand, this orientation angle has to be acute enough for such a gap 18 not to remain between the strips that would allow the part being detached during a chain blast to penetrate the protective structure 16. Accordingly, the gap between the strips cannot be substantially larger than 1 to 5 mm when observed from the direction of a movement path tangent of the lower edge of the guide bar or of an outer track 20 on the side of the saw casing of the chain wheel.

Consequently, the strips 17 of the present arrangement are arranged in accordance with FIG. 2 substantially radially relative to the chain wheel 14. However, in such a manner that each strip is arched or bent in such a manner than one surface 19 therein is arranged to settle to the movement path of the detached chain 13 or a part detaching from the chain. At each point of the protective lattice according to the arrangement is thus provided a strip whose surface is on the extension of some tangential movement path provided by the chain moving on the guide bar.

Such a design of the protective structure 16 also ensures that during felling-sawing, the sawdust stream generated in the sawing is guided from the strips away from the control cabin 2 and during crosscut-sawing as directly as possible to the ground.

On the other hand, in connection with crosscut-sawing, the present arrangement can also be implemented in the manner of the embodiment according to FIG. 3. In this embodiment, the above-mentioned strips 17 are arranged to create a cover-like structure in the saw casing 10, the structure being substantially parallel to the rotational axis of the chain wheel 14. However, to enable removal of sawdust or other impurities flowing to the saw casing during sawing, the strips are arranged substantially in the radial direction of the chain wheel on at least two planes such that at least one gap 18 remains between the strips.

The structures of the present arrangements are achieved by fastening the strips 17 substantially rigidly in the saw casing 10, either in a manner preventing disassembly e.g. by welding or in a manner allowing disassembly with some mechanical fastening known per se, such as screw fastening.

The strips 17 of the present arrangement are preferably made from the same material as the surrounding saw casing, but, naturally, nothing prevents them from being made from some other, for instance lighter composite material. The strips can also be coated for instance with an elastic or yielding material or another coating suitable for this purpose, to dampen the speed of movement of flying pieces.

The protective structure 16 of the above-described kind can also be implemented by the strips 17 constituting an integral whole to be fastened to the saw casing 10, for instance by arranging the strips in a common frame structure. This allows the installation and servicing of the protective structure to be significantly facilitated. Such a protective structure constituting a separate whole is also significantly simple to install in saw casings already in use.

It is to be understood that the above specification and the related figures are only intended to illustrate the present invention. The solution is thus not restricted solely to the embodiment described above or in the claims, but different variations and modifications of the invention will be apparent to those skilled in the art, without deviating from the idea disclosed in the attached claims.

The invention claimed is:

1. An arrangement in connection with a crosscutting saw of a harvester, a head of the harvester comprising:
    a saw casing and a chainsaw, arranged within the saw casing in a rotational manner, and a guide bar and a chain wheel, a chain of said chainsaw rotates around said guide bar and said chain wheel,
    the saw casing comprising strips on a cutting plane substantially flush with a rotational plane of the chain of the chainsaw, the strips being arranged in such a manner that a longitudinal axis of each of said strips is substantially parallel to the rotational axis of the chain wheel while defining saw dust openings between said strips,
    wherein the strips are arranged to overlap to provide a protective lattice structure in the saw casing, the protective lattice structure extending at least over the rotational plane of the chain of the chainsaw such that movement paths of the chain are generated at each of a plurality of turning points of the guide bar, said movement paths are arranged to encounter a surface in the strips, the strips being arranged to overlap in the saw casing such that at least one gap deviating from said movement paths remains between the strips, so that sawdust or other impurities flowing to the saw casing during sawing are dischargeable from the saw casing.

2. An arrangement as claimed in claim 1, wherein each of the strips is arranged substantially radially relative to the chain wheel.

3. An arrangement as claimed in claim 2, wherein each of the strips is arched so that a surface of a respective strip is in a movement path of the chain that extends toward a corresponding strip.

4. An arrangement as claimed in claim 1, wherein the strips are arranged substantially in a radial direction of the chain wheel on at least two planes such that said at least one gap remains between the strips.

5. An arrangement as claimed in claim 1, wherein the strips are fastened substantially rigidly to the saw casing.

6. An arrangement as claimed in claim 5, wherein the strips are fastened to the saw casing in a manner not enabling disassembly.

7. An arrangement as claimed in claim 5, wherein the strips are fastened to the saw casing in a manner enabling disassembly with a mechanical fastening.

8. An arrangement as claimed in claim 1, wherein the protective lattice structure comprises said strips arranged in a common frame structure to be fastened to the saw casing.

9. An arrangement as claimed in claim 1, wherein the strips are made from the same material as the surrounding saw casing.

10. An arrangement as claimed in claim 1, wherein the strips are made from a composite material.

11. An arrangement as claimed in claim 1, wherein the strips are coated with an elastic coating.

12. An arrangement as claimed in claim 7, wherein the mechanical fastening is a screw fastening.

13. An arrangement of a crosscutting saw of a harvester, a head of said harvester comprising:
    a saw casing;
    a chainsaw having a chain and being arranged within the saw casing in a rotational manner;
    a guide bar for guiding the chain;
    a chain wheel adjacent the guide bar around which the chain rotates; and
    plural strips on the saw casing each having a longitudinal axis that is substantially parallel to a rotational axis of the chain wheel,
    wherein the strips overlap each other with a gap between each strip and extend at least over a rotational plane of the chain, said gap enabling sawdust and other impurities flowing to the saw casing during sawing to be discharged from the saw casing in a direction other than a direction of rotation of the chain.

* * * * *